United States Patent Office 3,663,452
Patented May 16, 1972

3,663,452
HYDROGENATION CATALYST
Thomas E. Kiovsky, El Sobrante, and Milton M. Wald, Walnut Creek, Calif., assignors to Shell Oil Company, New York, N.Y.
No Drawing. Filed May 15, 1970, Ser. No. 37,912
Int. Cl. B01j *11/82*
U.S. Cl. 252—438    4 Claims

ABSTRACT OF THE DISCLOSURE

A catalyst for increasing the rate of hydrogenation reactions including a complex salt of the chloride, bromide or iodide of zinc, tin, antimony, bismuth, cadmium, gallium, mercury or arsenic, and the corresponding ammonium halide.

BACKGROUND OF THE INVENTION

Hydrogenation of hydrogenatable materials, such as petroleum fractions, is usually effected in the presence of a heterogeneous catalyst consisting of solid particles of refractory support material upon which a metal having activity as a hydrogenating catalyst is deposited. Typical of such catalysts are supports such as refractory oxides of aluminum, magnesium, or silicon or materials such as charcoal upon which are deposited metals or metal compounds having catalytic activity to promote hydrogenation, such as those in Group VIII, chromium, manganese and others. Although these heterogeneous catalysts are very active, they are susceptible to loss of activity. Activity may be lost by the action of catalyst poisons such as sulfur, nitrogen, oxygen or decomposed organo-metallic compounds, or by the screening effect on the catalyst surfaces of tar or coke formed from the hydrocarbons. These heterogeneous catalysts may also lose activity even without coke formation or the action of catalyst poisons because of changing crystal structure, physical breakdown of the support and other factors.

Particularly when treating difficult feeds such as coal or residual hydrogen fractions, these heterogeneous catalysts must be protected from poisons and other deactivating factors by expensive and difficult processes or the catalyst life is relatively short and the process employing such catalyst is corresponding expensive.

THE INVENTION

The present invention deals with hydrogenation catalysts that are not poisoned by the usual catalyst poisons and do not diminish in activity from prolonged use. The catalysts of this invention may be consumed by reacting with constituents in the material being treated, but the diminished activity is due to dilution and removal of a catalytically active ingredient. For example, organically bound nitrogen may react to form ammonia which will reduce the metal complex to the metal. However, reoxidation of the metal will restore the catalyst. The catalysts of this invention comprise systems including the ammonium halide complex of specific metal halides. The catalytic materials of this invention include the corresponding ammonuim halide complex of the chloride, bromide or iodide of zinc, tin, antimony, bismuth, cadmium, gallium, mercury or arsenic. Although the structure of the complex catalysts is not known certainty, especially at reaction conditions, analyses of the catalysts indicate them to have the general formula $(NH_4)_aMX_b$ wherein X is chlorine, bromine or iodine, M is one of the metals mentioned above, and $a$ and $b$ are whole numbers. The complex catalyst of this invention may be, and usually is, in a mixture with other materials such as small amounts of uncomplexed metal halide or excess ammonium halide. Typical examples of complexes of this invention are $(NH_4)_2SbBr_5$, $(NH_4)_2HgI_4$, $(NH_4)_2ZnBr_4$, $(NH_4)_2BiBr_5$, $(NH_4)_2BiBr_5$, $(NH_4)_2SbI_5$, $(NH_4)_2AsI_5$, $NH_4HgI_3$, $(NH_4)_2SnBr_4$, and $NH_4GaCl_4$.

The catalysts of the present invention preferably involve molten material that contain substantial quantities of the ammonium halide-metal halide complex. The molten phase is preferably employed as a bulk molten material, that is a continuous phase, through which the material to be converted is passed. The catalysts may include other materials such as alkali metal halides which are solvents or which form low melting mixtures but they will not contain substances such as the Lewis acids which produce acid cracking reactions. The catalysts may be employed as solid phase materials either alone or supported on adsorptive materials such as silica, alumina, charcoal or the like.

The catalysts of the present invention may be prepared by different techniques. One very suitable method for preparing the catalysts is by the direct reaction of ammonium halide with the corresponding metal halide. For example, the catalytic material $(NH_4)_2SbBr_5$ may be prepared by heating a 2:1 molar mixture of ammonium bromide and antimony tribromide at 300° C. in an autoclave. Catalysts with identical activity may also be prepared by crystallization of the complex from an aqueous hydrogen bromide solution of ammonium bromide and antimony bromide having a 2:1 molar ratio.

The following examples will illustrate the activity and manner of using some of the catalyst substances of the present invention. In all of the examples, the material was charged to an autoclave and subjected to thorough mixing during the reactions. The autoclave was heated with an electric heater, and in some instances it was charged with hydrogen to the indicated pressure prior to effecting the reaction while in other hydrogen was passed through the autoclave at the indicated pressure while the reaction was in progress.

Example I

Example I illustrates that the catalysts of the present invention are good hydrogenation catalysts under condition where their ability to promote the rate of hydrogenation reactions is measured alone. In Example I an autoclave was charged with a 2:1 ratio of $NH_4I$ and $HgI_2$ and with napthalene. The total quantity of catalyst was 210 grams while the total quantity of naphthalene was 10 grams. The autoclave was then pressured to 2000 p.s.i. with hydrogen and heated to 325° C. for a period of 30 minutes. Hydrogen was consumed as noted by a drop in the hydrogen pressure. Analysis of the resulting product revealed that a significant quantity of the naphthalene had been converted to tetraline with only trace quantites of lower molecular weight material being found. Similar experiments in hydrogenating naphthalene with other catalytic materials of this invention produced substantially the same results.

Example II

Hydrogenation of naphthalene, although illustrating the activity of a catalyst to promite hydrogenation reactions, does not indicate the ability of the catalyst to convert difficult feeds. The catalysts of this invention, accordingly, were employed to promote hydrogenation of coal to produce a liquid product referred to an synthetic crude in that it is a first step in producing petroleum-like products from coal. Coal is a difficult material to process because it is a solid phase material, it contains large quantities of combined oxygen, sulfur and nitrogen which in themselves or through their reaction products are known as poisons for many catalysts, it contains large quantites of mineral ash-forming material that normally clog a heterogeneous catalyst bed and introduce unwanted materials into the reaction zone, and principally because the hydrocarbon portion of coal is largely hydrogen-deficient condensed ring molecules that are resistant to hydrogenation and tend to condense to even higher molecular weight materials forming what is known in the art as char or coke when subjected to high temperatures. The following table illustrates the use of the catalytic materials of this invention in converting Illinois No. 6 coal to liquid products wherein the desired product is a synthetic crude that contains liquid phase high molecular weight hydrocarbons. The following table reports a series of these experiments conducted at the conditions shown in the table and the results obtained.

and catalyst of the present invention to precede a cracking, hydrocracking, reforming or combination process would not only protect the catalyst materials of the subsequent processes but would in addition create a more easily handled feedstock because the product from the process has a higher hydrogen to carbon ratio and therefore is less susceptible to forming coke and other undesired material during the subsequent conversion reactions. The process of the present invention employing the catalytic materials of this invention may also be used as a first-stage treatment preceding conversion of coal with a homogeneous catalyst, such as antimony tribromide which is an active catalyst for hydrocracking heavy hydrocarbons to produce high yields of gasoline and low yields

| Experiment No. | 1 | 2 | 3 | 4 | 5 | 6 | 7 | 8 | 9 |
|---|---|---|---|---|---|---|---|---|---|
| Time, min | 60 | 60 | 60 | 60 | 60 | 60 | 60 | 60 | 30 |
| Temperature, °C | 350 | 400 | 400 | 350 | 330 | 350 | 390 | 400 | 350 |
| Pressure, p.s.i. | 1,800 | 1,800 | 1,800 | 1,800 | 1,800 | 1,800 | 1,800 | 1,800 | 1,800 |
| Catalyst | $SbBr_3$ | $(NH_4)_2SbCl_5$ | $(NH_4)_2SbBr_5$ | $(NH_4)_2SbBr_5$ | $(NH_4)_2AsI_5$ | $(NH_4)_2BiBr_5$ | $(NH_4)_2ZnBr_4$ | $(NH_4)_2ZnI_4$ | $(NH_4)HgI_3$ |
| Amount, g | 144 | 104.8 | 238 | 238 | 193 | 145 | 210 | 183 | 211 |
| Coal, g | 40 | 40 | 40 | 40 | 40 | 20 | 40 | 20 | 10 |
| Hydrogen consumed, g./100 g. MAF coal [a] | 7.2 | [b] | 5.9 | 5.8 | 8.1 | 4.9 | 4.2 | 6.5 | 6.3 |
| $C_1$-250° C. product, g./100 g. MAF coal [a] | 57% | [b] 9 | 20.58 | 8.2 | 9.9 | 15.9 | 6.0 | 22.5 | 3.1 |

[a] Coal calculated as moisture and ash-free.
[b] All gas product lost in experiment so total $H_2$ consumed and total light product can only be approximated.

In all cases the product from the autoclave contained large quantities of liquid phase hydrocarbon together with the inorganic ash that was included in the charge and unconverted coal. Equivalent, although not identical, results are obtained with the other catalytic materials of the present invention. The catalytic activity illustrated in the above table indicates that the catalysts of the present invention are capable of producing a useful product from a difficult material to process. In addition to creating a liquid phase from coal, it may be added that all of the liquid products were substantially richer in hydrogen than the charge, and were either substantially free from or had only negligible quantities of combined oxygen, sulfur and nitrogen in their molecular structure because they were converted, respectively, to water, hydrogen sulfide, and ammonia during the conversion reactions. Additionally, the liquid phase product either contains no ash or is readily separated from the solid ash so that it is eminently suitable for subsequent processing to produce solvents, chemical compounds, or for being subjected to cracking reactions to produce such materials as gasoline, jet fuel, lubricating oil, etc. Experiment No. 1 illustrates the amount of cracking that is effected when an acid-acting catalyst is employed under the same conditions. The cracking is indicated by the large amount of conversion to material boiling below 250° C. caused by the catalyst of Experiment No. 1.

The process of the present invention employing the catalysts of this invention is eminently suitable as a first-stage in a multi-stage process. A catalytic process employing a very sensitive catalyst may be preceded by the process of the present invention employing the catalytic materials of the present invention to produce a feedstock that is purified with respect to substantially any material that would poison a sensitive catalyst. For example, in processes for producing low boiling liquid distillate materials from coal, heterogeneous catalysts such as silica-alumina cracking catalyst, platinum-alumina reforming catalysts and others may be employed. The usual heterogeneous catalysts are sensitive to poisons and cannot tolerate solid inclusions in the charge stock, and a process for hydrogenating and liquefying coal using the process of relatively undesirable products such as normally gaseous hydrocarbons, coke and tar-like products.

We claim as our invention:

1. A catalyst system useful to promote hydrogenation reactions comprising a complex salt of the chloride, bromide, or iodide of zinc, tin, antimony, bismuth, cadmium, gallium, mercury or arsenic and the corresponding ammonium halide with said complex disposed on a solid support.

2. The catalyst of claim 1 wherein the complex salt is $(NH_4)_2SbBr_5$.

3. The catalyst of claim 1 wherein the complex salt is $(NH_4)_2HgI_4$.

4. The catalyst of claim 1 wherein the complex salt is $(NH_4)_2AsI_5$.

References Cited

UNITED STATES PATENTS

| 259,145 | 6/1882 | Hennebutte et al. | 23—100 |
| 2,012,809 | 8/1935 | Derick | 23—100 UX |
| 2,288,405 | 6/1942 | Kepfer | 23—100 X |
| 2,417,068 | 3/1947 | Farlow et al. | 252—438 X |

OTHER REFERENCES

Heslop et al., Inorganic Chemistry, third edition, pub. by Elsevier Pub. Co., New York, N.Y. (1967), p. 358, 414, 464, 549, 748 and 756.

Lange's Handbook of Chemistry, ninth edition, pub. by Handbook Pub., Inc., Sandusky, Ohio (1956), p. 216.

Mellor, Modern Inorganic Chemistry, pub. by Longman's, Green & Co., New York, N.Y. (1939), pp. 156 and 700.

Rose et al., The Condensed Chemical Dictionary, fifth edition, pub. by Reinhold Pub. Corp., New York, N.Y. (1956), pp. 197, 299, 694, 1187.

Pelipetz et al., "Effects of Catalysts on the Hydrogenolysis of Coal," Industrial and Engineering Chemistry, vol. 40, No. 7, July 1948, pp. 1259–64.

PATRICK P. GARVIN, Primary Examiner

U.S. Cl. X.R.

208—10; 260—667